US007931038B2

(12) United States Patent
Jesus

(10) Patent No.: US 7,931,038 B2
(45) Date of Patent: Apr. 26, 2011

(54) PORTABLE CONTAINER COVERING SYSTEM

(76) Inventor: Stephan J. Jesus, Dracut, MA (US)

( * ) Notice: Subject to any disclaimer, the term of this patent is extended or adjusted under 35 U.S.C. 154(b) by 118 days.

(21) Appl. No.: 12/288,419

(22) Filed: Oct. 21, 2008

(65) Prior Publication Data

US 2010/0095993 A1 Apr. 22, 2010

(51) Int. Cl.
*E04H 15/06* (2006.01)
*B60P 7/02* (2006.01)

(52) U.S. Cl. ................. 135/119; 135/88.16; 296/100.16

(58) Field of Classification Search ............... 135/88.14, 135/88.16, 96, 115, 117–119, 906–907; 296/100.11, 296/100.15–100.18, 103–104; 52/3–5, 23, 52/25, 86, 169.7; 4/489, 503; 294/68.2, 294/68.26
See application file for complete search history.

(56) References Cited

U.S. PATENT DOCUMENTS 3,226,153 A * 12/1965 Haid ............................ 296/104
4,421,366 A * 12/1983 Niziol ....................... 312/265.6
4,823,707 A * 4/1989 Salsbury et al. ......... 105/377.02
4,979,456 A * 12/1990 Steward ........................ 114/351
5,152,574 A * 10/1992 Tucker ..................... 296/100.18
5,186,513 A * 2/1993 Strother ................... 296/100.15
5,353,826 A * 10/1994 Davis, Sr. .................. 135/88.13
5,447,354 A * 9/1995 Delp ............................. 296/104
5,487,584 A * 1/1996 Jespersen ................. 296/100.18
5,511,843 A * 4/1996 Isler et al. ................ 296/100.17
5,873,210 A * 2/1999 Brumleve ................ 296/100.17
5,988,195 A * 11/1999 Kaestner et al. .............. 135/144
6,361,100 B1 * 3/2002 Koester .................... 296/100.18
6,487,734 B1 * 12/2002 First .................................. 4/498
6,532,704 B2 * 3/2003 Hart ................................ 52/202
7,510,230 B2 * 3/2009 Chenowth ................ 296/100.16
2005/0017536 A1 * 1/2005 Dapprich .................. 296/100.1
* cited by examiner

*Primary Examiner* — Winnie Yip
(74) *Attorney, Agent, or Firm* — Lambert & Associates; Gary E. Lambert; David J. Connaughton, Jr.

(57) ABSTRACT

A portable, light-weight, removable system for covering an open dumpster or refuse container mechanism. This instant system is designed for easy installation, removal and storage. Once installed, the system covers the open dumpster container, preventing accumulation of rain, snow, sleet, and any mix thereof inside the container and/or contents of the container.

6 Claims, 4 Drawing Sheets

PORTABLE CONTAINER COVERING SYSTEM

BACKGROUND OF THE INVENTION

1. Field of Invention

This instant invention resides in the field of dumpsters and rubbish containers and more specifically accompanying removably attached covering systems.

2. State of the Art

Container systems, possessing rearwardly hinged lids, are commonly supplied by county, city, or other civic subdivisions, for periodic removal of refuse, normally by public utility vehicles. These systems are mainly utilized in areas where the amount of rubbish is much less than that of a business or apartment complex. During collection, lift arms of the garbage truck pick up the container and tilt it to dumping position with lid swung open. The contents of the container are thereby emptied into the truck, whereupon the arms of the truck set the container back to its previous, upright standing position.

Dumpster type apparatuses are normally utilized by business establishments, apartment complexes, and other entities for the collection and temporary storage of rubbish and are, therefore, larger than residential containers. However, they are emptied in a similar manner, but different problems must be taken into account.

A dumpster is normally a voluminous container which attracts unauthorized users to deposit their rubbish therein. Unauthorized use of dumpsters is not easily detected amongst the large number of legitimate users. Prior art solved the unauthorized use problem by attaching a self-disengaging lock between the hinged lid and the body of the dumpster, see U.S. Pat. No. 5,149,153. To load the dumpster, a key is required to release a latch that is provided for securing the dumpster lid. However, when unlocked, the latch is automatically released as the dumpster is tilted into the dumping position. This lid is not usually part of a construction rubbish type dumpster. The smaller, residential rubbish containers pose fewer problems with unauthorized use. The added level of complexity in providing the self-disengaging lock of a dumpster to prevent unauthorized use is therefore unwarranted in the smaller residential type of containers. Additional present embodiments include larger dumpster/containers that are not emptied by trucks, but rather are trailered back to the dump site for emptying and normally possess no lid. These inventions for roll-off type dumpsters have exhibited problems with accumulation of snow, ice or water, due to lack of a proper covering and protection apparatus. Thus when the rental user returned the dumpster and the dumpster was weighed out by the dumpster owner, the rental user would be forced to pay for the total weight. What is needed is an easily installable and easily removable device or system designed to cover containers, particularly roll-off type dumpsters, and protect from snow, ice and water entering said dumpster.

SUMMARY OF THE INVENTION

The instant invention, as illustrated herein, is clearly not anticipated, rendered obvious, or even present in any of the prior art mechanisms, either alone or in any combination thereof. A versatile container lid system, which can be quickly installed or removed and adapts to differing conditions to protect said container, adapted to compensate for the aforementioned drawbacks and limitations would afford significant improvement to numerous useful applications. Thus the several embodiments of the instant invention are illustrated herein.

When a dumpster is rented a standard fee is paid on return for the rental and a set amount of weight. Anything over that weight is billed at a per ton fee. Usually, the dumpster sits uncovered and its contents are exposed to weather. Some of the contents will absorb moisture (rain, snow, etc.) and the final weight will be greater than the dry weight; consequently, the rental fees will be higher.

Currently, no known alternative solutions exist for roll-off dumpsters. Simply throwing a tarp over the dumpster would not protect its contents from the weather, because the tarp would sag from rain/snow and eventually expose the contents to moisture.

Therefore, it is an object of the instant invention to keep the dumpster contents dry, by protecting them from the weather; as a result, the dumpster should weigh less upon return, leading to a cost savings.

It is an object of the instant invention to create a portable structure over which a tarp can be placed and easily removed.

It is an object of the instant invention to establish a framework which is sturdy enough to support the weight of the tarp as well as any collecting rain, snow or ice.

It is an object of the instant invention to illustrate a mechanism disposed to orient a tarp at the correct angle to allow rain/snow/ice to properly slide off of the mechanism and not accumulate.

Furthermore, it is an object of the instant invention to introduce a framework disposed to allow a tarp to be easily removed or rolled back into a flexible storage position when access to the dumpster or containing mechanism is required.

Finally, it is an object of the instant invention to illustrate a system which is portable and amenable to quick and easy disassembly, storage, and reassembly.

There has thus been outlined, rather broadly, the more important features of the versatile removably attachable container covering system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE EMBODIMENTS

Figure 1:
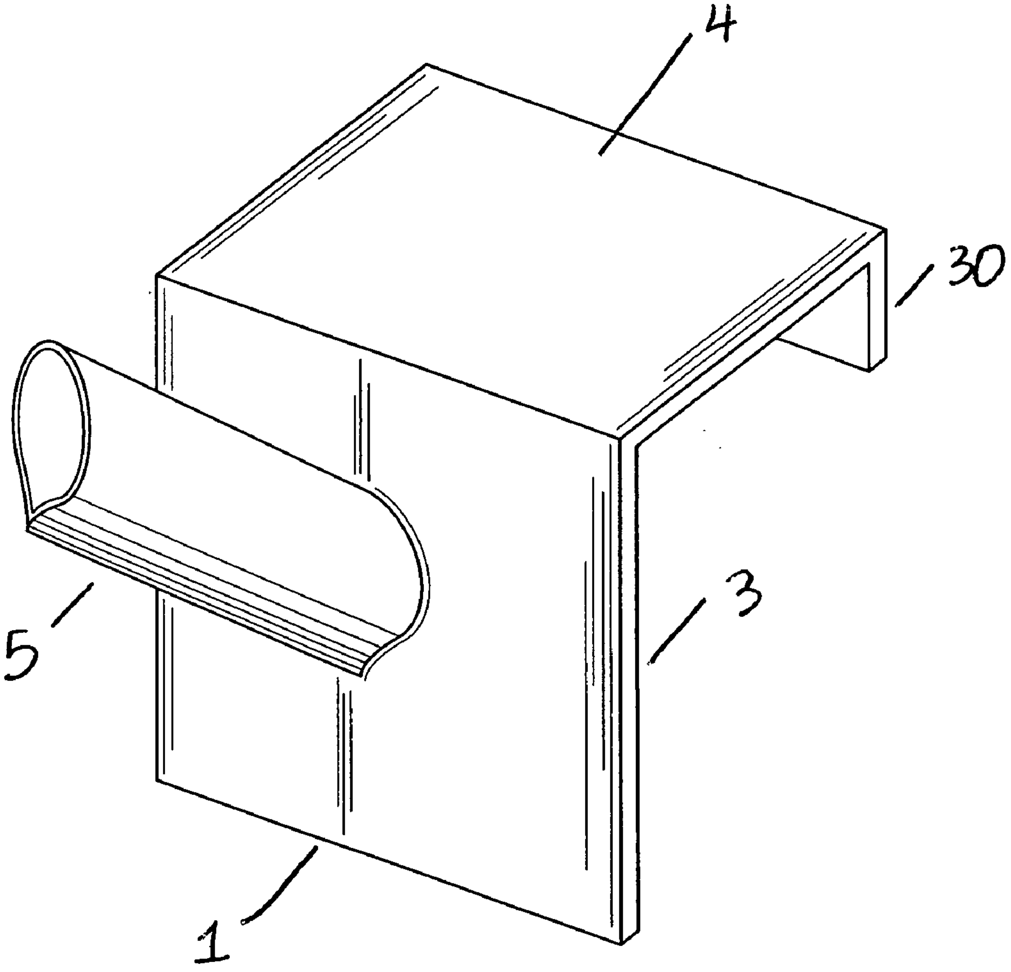
FIG. 1 illustrates an isometric side view of the bracket mechanism of the instant system.

The present invention includes a container covering system comprising a removably attachable framework comprising a multiplicity of bracket members 1 and a multiplicity of substantially malleable members 2. In one embodiment, an individual of said bracket members 1 comprises at least two first rectangular planer members 3 disposed in substantially parallel relation and wherein at least one of said two first rectangular members comprises a mechanism disposed to receive an individual of said multiplicity of substantially malleable members 2. Also included may be at least one second rectangular planer member 4 disposed substantially perpendicular to said at least two first rectangular planer members wherein said at least one second rectangular plane is fixably attached to each of said at least two first rectangular planer members and wherein said at least one second rectangular planer member is comprises a receiving mechanism 5 disposed to receive a first end of an individual of said multiplicity of substantially malleable members, and a substantially waterproof flexible cover apparatus 6, disposed to cover said removably attachable framework.

Figure 2:
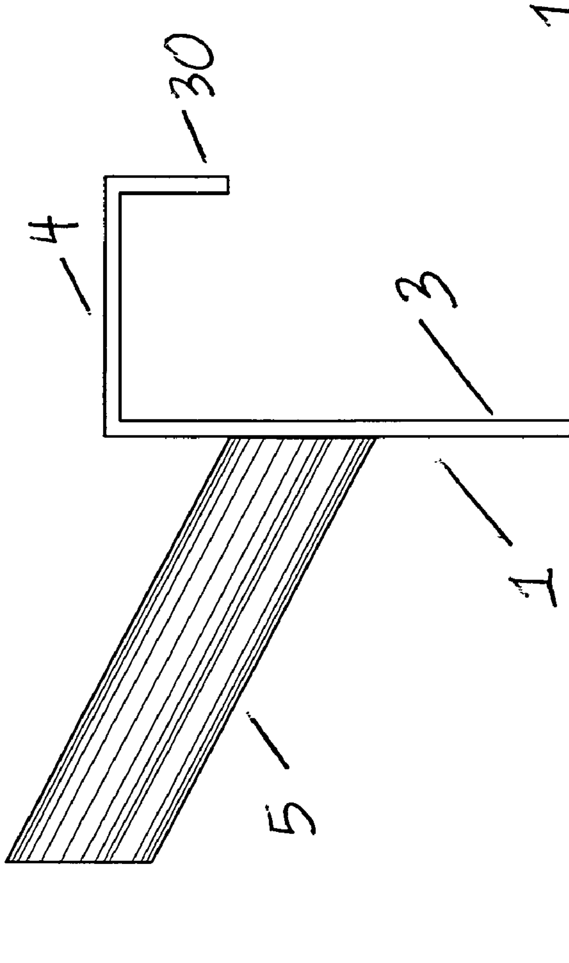
FIG. 2 illustrates a side view of the bracket mechanism of the instant system.
Figure 3:
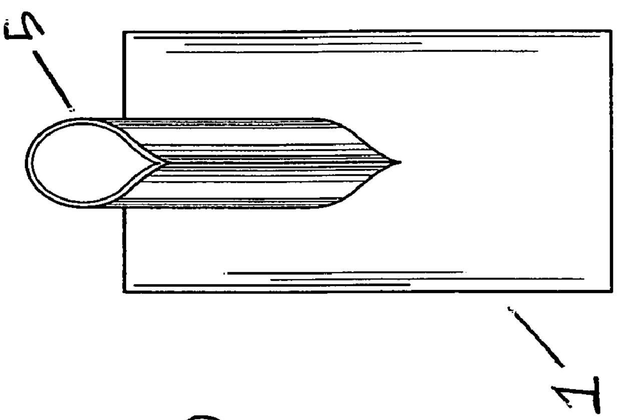
FIG. 3 illustrates a front view of the bracket mechanism of the instant system.

FIG. 1 illustrates an isometric side view of the bracket mechanism 1 of the instant system illustrating the flexible, bendable or malleable members, pipe-like mechanisms or receiving mechanism 2. FIG. 2 illustrates a side view of the bracket mechanism 1 of the instant system, further illustrating the flexible, bendable or malleable members, pipe-like mechanisms or receiving mechanism 2. FIG. 3 illustrates a front view of the bracket mechanism 1, also of the instant system illustrating the flexible, bendable or malleable members, pipe-like mechanisms 2 attached to the receiving mechanism 5.

Figure 4:
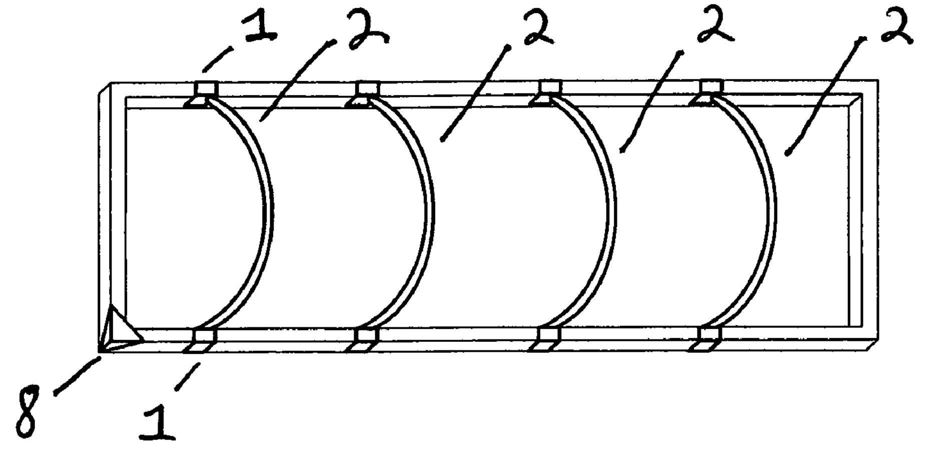
FIG. 4 illustrates an isometric view, from above, of the overall assembled framework of the instant system prior to installation of a protective cover of the present system.
Figure 5:
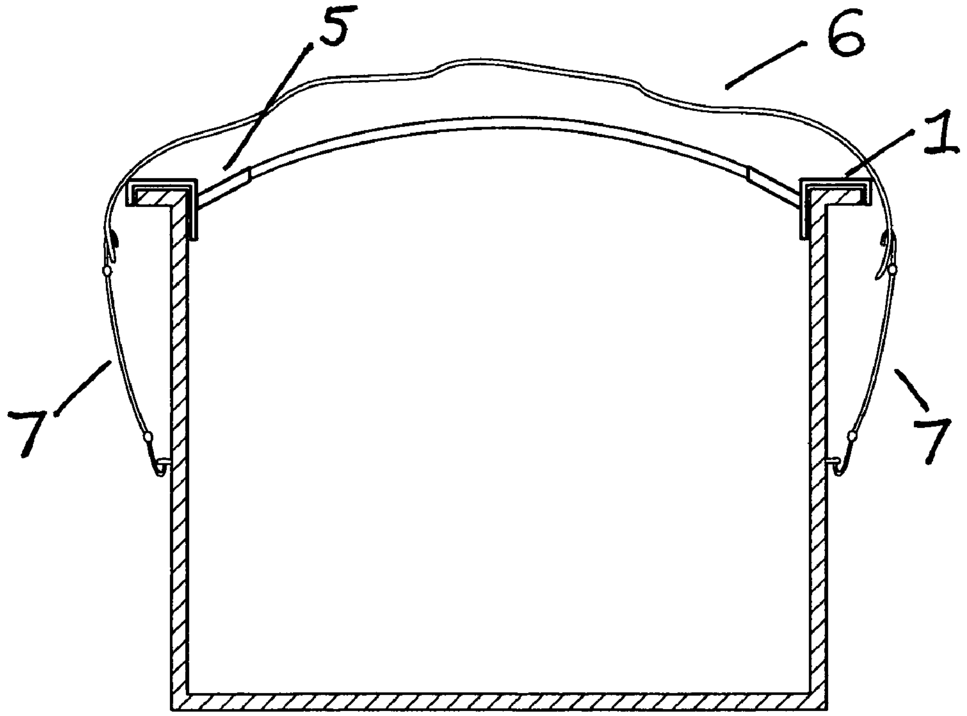
FIG. 5 illustrates a side view of the present invention and further illustrates the substantially waterproof flexible cover apparatus comprising and the retaining mechanism as a system of bungee cords.
Figure 6:
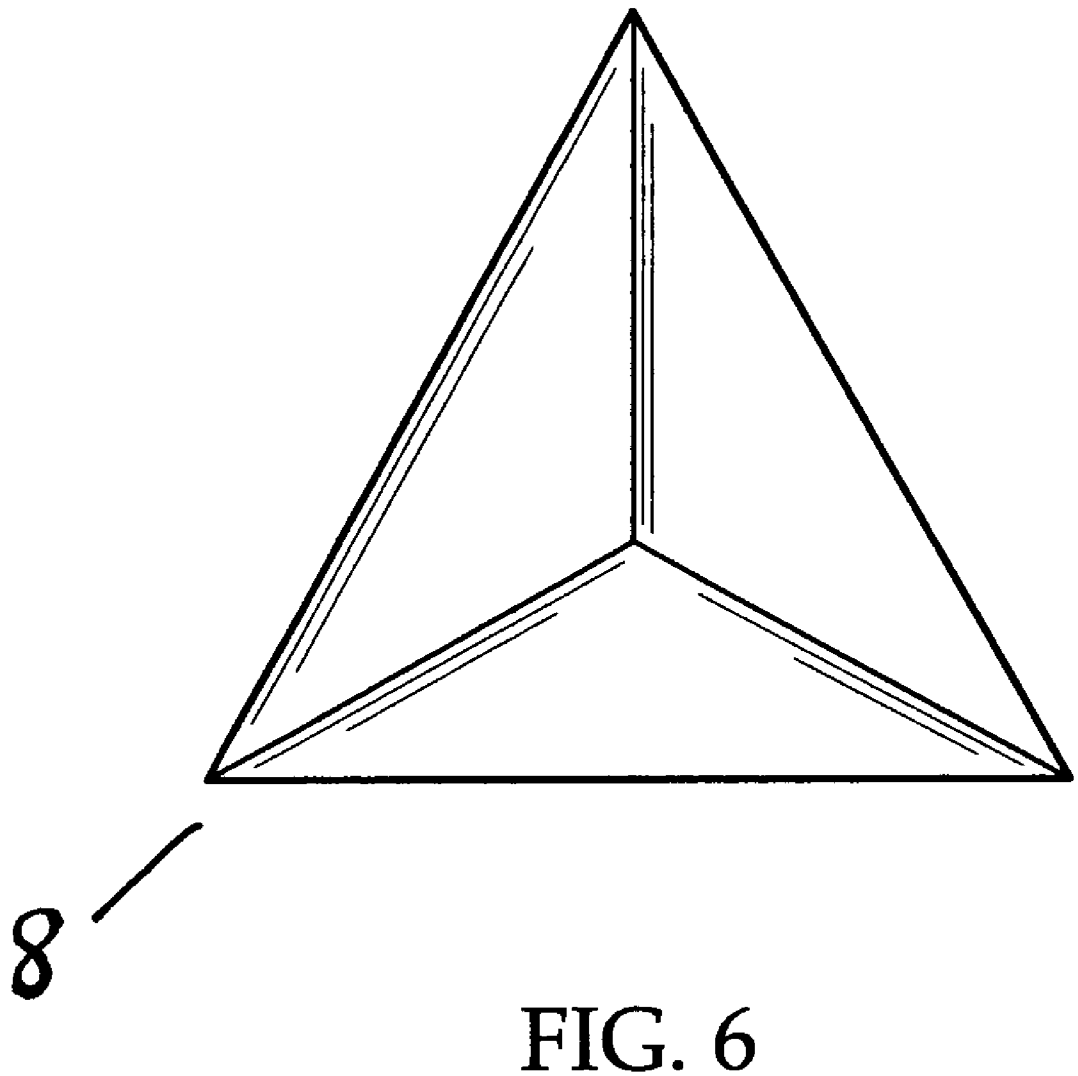
FIG. 6 illustrates a plan view of an individual of the three sided corner guards.

FIG. 4 illustrates an isometric view, from above, of the overall assembled framework of the instant system prior to installation of a protective cover of the present system. FIG. 5 illustrates a side view of the present invention and further illustrates the substantially waterproof flexible cover apparatus 6 comprising and a retaining mechanism such as a system of bungee cords 7. FIG. 6 illustrates a plan view of an individual of the three sided corner guards.

In one embodiment, the device may comprise a multiplicity of three sided corner guard devices 8. Also, the receiving mechanism 5 disposed to receive an individual of said multiplicity of substantially malleable members may comprise a cylindrical shape and may further comprise an outer diameter substantially equal to an inner diameter of an individual of said multiplicity of substantially malleable members. In one embodiment, the malleable members may comprise PVC pipe and may be, but are not limited to, one inch and one half (1½) inch diameter or one and one quarter (1¼) inch.

In addition, the multiplicity of bracket members may be removably attached to at least two opposing sides of an open container and wherein said malleable members are removably inserted into the said opening of the said brackets, creating a removably attached frame above said open container; and wherein said substantially waterproof flexible cover apparatus is removable disposed to cover said multiplicity of substantially malleable members and wherein said substantially waterproof flexible cover apparatus is removably attached to said open container. In the preferred embodiment, the said multiplicity of bracket members are molded from high strength plastic. Moreover, the multiplicity of bracket members may be disposed in substantially equidistant pairs on two opposite sides of an open container, and the said malleable members form an inversed U-shaped frame disposed to support said substantially waterproof flexible cover apparatus.

In an alternate embodiment, the multiplicity of bracket members may be disposed in substantially equidistant pairs on two opposite sides of an open container, and the said malleable members form an inversed V-shaped frame disposed to support said substantially waterproof flexible cover apparatus. Alternatively, the multiplicity of bracket members may be disposed in substantially equidistant pairs on two opposite sides of an open container, and the said malleable members form an dome-like frame disposed to support said substantially waterproof flexible cover apparatus.

In a further embodiment, the dumpster covering system may comprise at least one bendable member comprising a cylindrical shape and comprising a first end comprising a cavity and a second end comprising a cavity. The dumpster covering system may further comprise at least two bendable member receiving bracket devices disposed to clamp to said dumpster, each comprising a first substantially vertically disposed rectangular member and a second substantially vertically disposed rectangular member wherein said first substantially vertically disposed rectangular member and said second substantially vertically disposed rectangular member are positioned substantially parallel. The instant embodiment may further comprise one horizontally disposed rectangular plane, disposed substantially perpendicular relative to said first substantially vertically disposed rectangular member and said second substantially vertically disposed rectangular member and wherein the one rectangular plane non-removably attached to edges of each of the two said rectangular planes and a protruding member, disposed on at least two of said two rectangular planes, insertable into the said cavity on each end of the said bendable members.

In one of the preferred embodiments, the bracket mechanisms may be designed and spaced to fit anywhere from one to four or more on a dumpster side, wherein each is disposed to support the flexible, bendable or malleable members or pipe-like mechanisms in place. This, the brackets mechanisms may be designed to fit over the dumpster sides and stay attached through the torque and tension imposed by the opposing ends of the engaged pressure of the flexible, bendable or malleable members or pipe-like mechanisms. These flexible, bendable or malleable members or pipe-like mechanisms may comprise standard (1½ inch) half inch or (1¼) PVC pipes, which can be purchased at home improvement stores. These flexible, bendable or malleable members or pipe-like mechanisms pipes thus fit over the brackets and form the framework for the removable waterproof protective covering.

Further, multisided corner guard mechanisms are included and are designed to be placed over the 4 corner edges of the dumpster or container to protect the removable waterproof protective covering from rubbing against the rough edges of the dumpster and possibly tearing. Tarps are designed to fit standard dumpster sizes, including 12×24, or larger, or smaller, depending on the application.

Lastly, it is favorable for one of said at least two first rectangular planer members to be eight inches, but not limited to this length in length and other of said at least two first rectangular planer members is one inch in length and one inch respectively, and wherein an opening capable of receiving one end of the said bendable member is located on the said eight inch side. The brackets may vary in length in order to accommodate differing needs.

While several embodiments of the instant invention have been illustrated by way of example, it is apparent that further embodiments could be developed within the spirit and scope of the instant invention. However, it is to be expressly understood that such modifications and adaptations are within the spirit and scope of the instant invention, as set forth in the following claims.

What is claimed is:

1. A portable container covering system comprising:

a removably attachable framework comprising:

a multiplicity of substantially malleable members a multiplicity of bracket members wherein an individual of said bracket member comprises:

a mechanism disposed to receive an individual of said multiplicity of substantially malleable members;

a first rectangular planar member wherein said mechanism disposed to receive said substantially malleable members is connected to said first rectangular planar member and extending therefrom at an angle between 30 and 60 degrees;

a second rectangular planar member disposed substantially perpendicular to said first rectangular planar member wherein said second rectangular plane is fixably attached juxtaposition to said first rectangular planar member;

a third rectangular planar member disposed substantially parallel to said first rectangular member and perpendicular to said second rectangular member wherein said third rectangular planar member is fixably attached juxtaposition to said second rectangular planar member; and a substantially waterproof flexible cover apparatus comprising a retaining mechanism, disposed to cover said removable attached.

2. The portable container covering system of claim 1 further comprising a multiplicity of three sided corner guards removably attached to the corner edges of the container.

3. The portable container covering system of claim 1, wherein said multiplicity of bracket members are removably attached in substantially equidistant pairs to at least two opposing sides of an open container and wherein said malleable members are removably inserted over said bracket members, creating a removably attached frame above said open container; and wherein said substantially waterproof flexible cover apparatus is removably disposed to cover said multiplicity of substantially malleable members and wherein said substantially waterproof flexible cover apparatus is removably attached to said open container.

4. A portable dumpster covering system comprising:

at least one bendable framing member comprising a cylindrical shape and comprising a first end comprising a cavity and a second end comprising a cavity;

at least two bendable member receiving bracket devises disposed to claim to a subject dumpster, each comprising:

a first substantially vertically disposed rectangular member;

a horizontally disposed rectangular member, disposed substantially perpendicular in relation to said first substantially vertically disposed member and wherein said horizontally disposed rectangular member joins juxtaposition said first substantially vertically disposed rectangular member;

a second substantially vertically disposed member wherein said second substantially disposed rectangular member is positioned substantially parallel to said first substantially vertically disposed member and substantially perpendicular to said horizontally disposed rectangular member, wherein said second substantially vertically disposed rectangular member joins juxtaposition said horizontally disposed rectangular member; and a protruding member, disposed on said first substantially vertically disposed rectangular member at an angle between 30 and 60 degrees, insertable into said cavity on each end of said bendable members;

wherein said at least two bendable receiving bracket devices are removably attached to at least two opposing sides of an open container, and said bendable members are removably attached to said at least two bendable member receiving bracket devices, creating a removably attached framework above a subject dumpster; and a waterproof flexible cover, capable of covering the said removable frame, wherein said at least two bendable member receiving bracket devices disposed to claim to said subject dumpster engages said subject dumpster with said horizontally disposed rectangular member is substantial contact with said subject dumpster.

5. The portable dumpster covering system of claim 4 further comprising a multiplicity of three sided dumpster corner guard devices removably attached to the corner edges of the dumpster and disposed to protect said waterproof flexible cover.

6. The portable dumpster covering system of claim 4, wherein said at least two bendable member receiving bracket devices disposed to clamp to said subject dumpster are disposed in substantially equidistant pairs on two opposite sides of an open container.

* * * * *